United States Patent [19]

Kutschke

[11] 4,049,480
[45] Sept. 20, 1977

[54] METHOD AND APPARATUS FOR FORMING A JOINT IN A CONFINED SPACE BETWEEN TWO ABUTTING ENDS OF CONDUIT LINERS

[75] Inventor: C. T. Kutschke, Dallas, Tex.

[73] Assignee: Nipak, Inc., Dallas, Tex.

[21] Appl. No.: 621,406

[22] Filed: Oct. 10, 1975

[51] Int. Cl.² .................................... B32B 35/00
[52] U.S. Cl. ............................ 156/94; 61/72.2; 138/99; 156/79; 156/304; 264/36; 264/46.5; 264/46.6; 264/46.9; 285/15; 285/294
[58] Field of Search ............... 156/94, 304, 79; 264/36, 46.4, 46.5, 46.6, 46.9; 138/97, 99; 61/72.2; 285/292, 294, 15

[56] References Cited

U.S. PATENT DOCUMENTS

| | | | |
|---|---|---|---|
| 2,857,931 | 10/1958 | Lawton | 264/46.4 |
| 2,930,634 | 3/1960 | Merritt | 156/304 |
| 3,163,181 | 12/1964 | Xenis et al. | 138/97 |
| 3,258,512 | 6/1966 | Flowers et al. | 264/46.9 |
| 3,616,516 | 11/1971 | Corriston | 264/36 |
| 3,826,521 | 7/1974 | Wilhelmsen | 156/98 |
| 3,950,461 | 4/1976 | Levens | 264/46.5 |

Primary Examiner—Edward G. Whitby
Attorney, Agent, or Firm—Richards, Harris & Medlock

[57] ABSTRACT

Disclosed is a method and apparatus for forming a joint in a confined space between two abutting ends of conduit liners. In the method, an excavation is formed to provide access to a buried conduit. Thereafter, the conduit is opened and cleaned of debris and elongated sections of conduit liner are inserted through the opening into the conduit in opposite directions from the opening. Once insertion is completed, a sleeve is positioned concentrically around one of the conduit section ends. The ends of the sections are positioned in an abutting coaxial relationship and are aligned and attached together by tape. The sleeve is then moved to a position overlapping the intersection of the two sections and the annular space between the sleeve and the exterior of the conduit sections is closed by sealing with foam rubber stripping constrained by tape. A polyurethane material is injected through a port in the sleeve to fill the annular space. Thereafter, the polyurethane material is allowed to set.

11 Claims, 5 Drawing Figures

U.S. Patent  Sept. 20, 1977  4,049,480
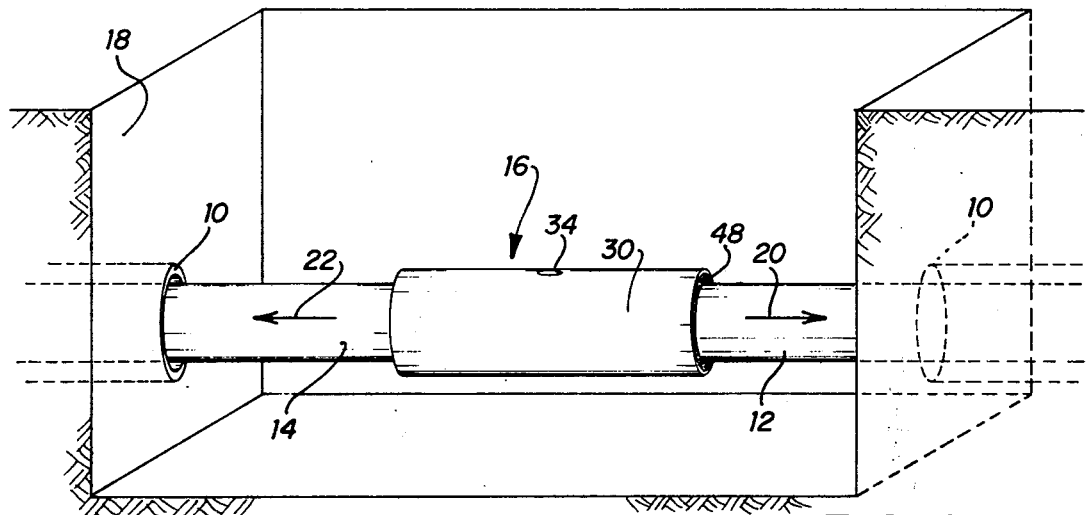
FIG. 1
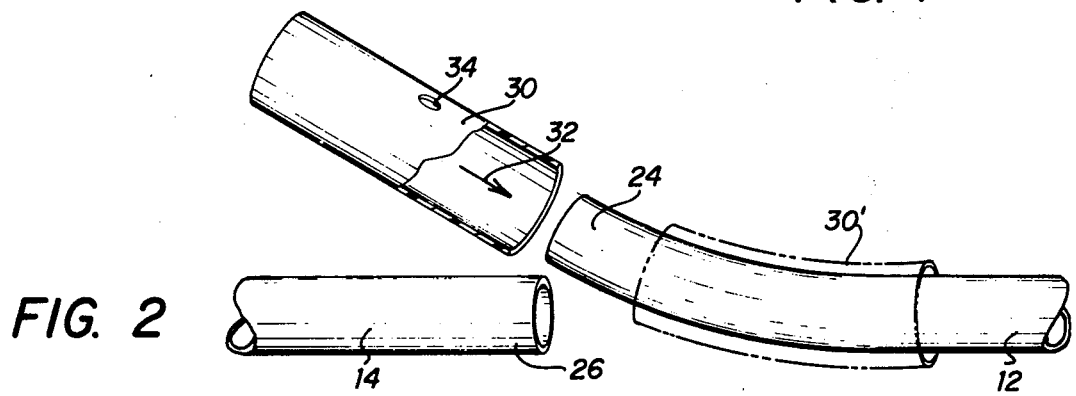
FIG. 2
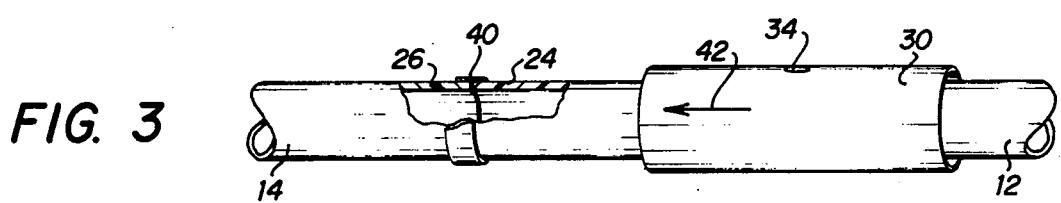
FIG. 3
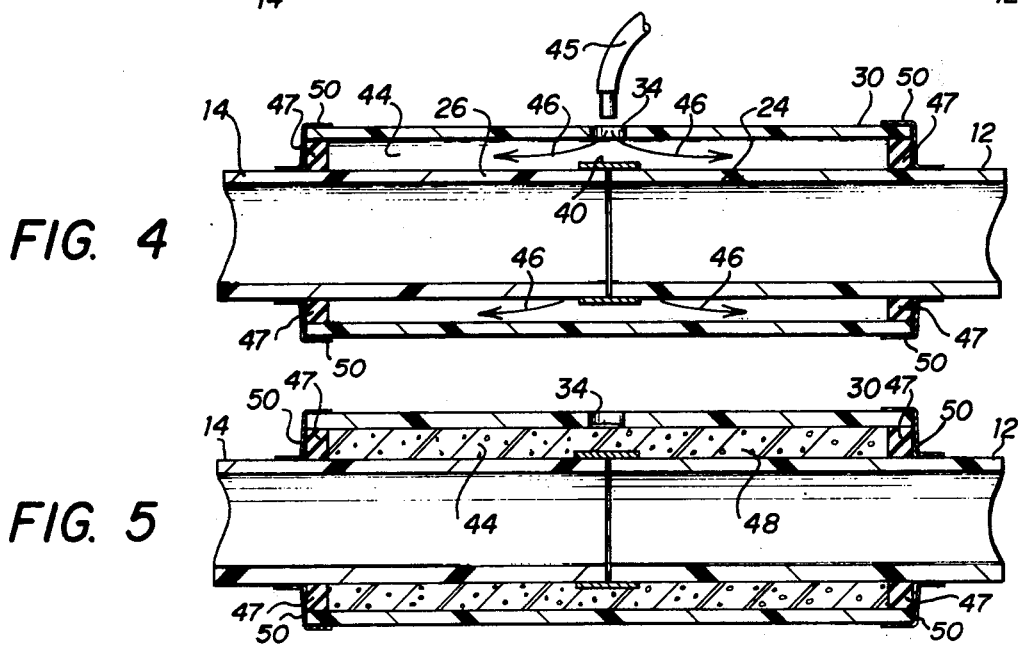
FIG. 4
FIG. 5

METHOD AND APPARATUS FOR FORMING A JOINT IN A CONFINED SPACE BETWEEN TWO ABUTTING ENDS OF CONDUIT LINERS

BACKGROUND OF THE INVENTION

The present invention relates to the repair and reconditioning of buried conduits such as sewage lines, drainage lines, and the like. More particularly, the present invention relates to the coupling of abutting ends of liners for buried conduits with the coupling being performed within the limited confines of an excavation.

In the past, it has been common to use masonry and clay conduits buried in the ground for sewage systems, drainage systems, and the like. Although these buried systems have been quite satisfactory for their purpose, it has been found that over a period of time, these conduit systems can deteriorate and become damaged. This deterioration can be as a result of many causes, such as root action, soil movement, deterioration of the pipe material, and the like. The conventional method of repairing buried conduit systems is to completely excavate the system and repair the damaged portions thereof. The disadvantages of this conventional repair method is apparent when it is considered that the systems are commonly positioned under the street or roadway, and are buried in the ground from 6 to 30 feet. Thus, substantial expenses can be involved in the excavation and repair.

In addition, when the systems are located below roadways and other structures, complete excavation will require that these structures be disturbed and repaired. In addition, this method can require substantial periods of time, and during this time, use of the sewage system and roadways is restricted.

To overcome the disadvantages of the complete excavation method of repairing and reconstructing buried conduits, a method has been used wherein a flexible liner of suitable material is axially inserted into the conduit to reline the conduit. These liners can be made from polyethylene, polyvinylchloride, polybutylene, polypropylene, or the like.

In these methods, liners can be pushed through a length of main to another point where access to the main is convenient spanning distances up to 1500 ft. In some situations, access to the main can be obtained at existing manholes, or the like. In other situations, excavations spaced along the length of the main are required. In each instance, access to the main is limited in space either by the confines of the manhole or by the size of the excavation.

One method of relining buried conduits, which has proven to be successful, involves inserting conduit liners of a sufficient length between adjacent access points. At each access point, the liners are inserted into the main in two directions. This method has created a need for providing a quick and convenient method and apparatus for coupling the abutting liner sections together within the confines of the manhole or excavation. One coupling method, the use of which has been proposed in the present environment, has involved heat fusing the abutting conduit sections together. Conventionally, bulky jigs, heating elements and other equipment are required to form a fusion joint between abutting conduit ends. This bulky equipment is difficult, if not impossible, to use within the space confines. Therefore, even though the fusion method can form a strong coupling between abutting sections, the method is extremely difficult to use in limited space confines, such as a manhole or excavation. In addition, it is impossible to effectively join polyethylene pipe by fusion when the pipe is wet, such as would be present in a system which is in service.

Another method proposed for use in coupling abutting sections of liner uses heat shrink sleeves. Although heat shrink sleeves form tight couplings, a difficulty is present in their use in this environment. This difficulty stems from the fact that the sleeves require the use of an open flame to cause them to shrink around the exterior of the conduit sections. Since in many cases, the sections are joined in open sewer conduits wherein sewer gases are present, the use of an open flame can cause an explosion. In addition, the necessity of the sleeves being able to shrink around the conduit liner places limitations on the maximum thickness of the sleeves which can result in unacceptable strength limitations.

A third method of coupling abutting sections of conduit liner which has been proposed for use in the present environment is the use of a compression fitting. Compression fittings involve the use of resilient liner inside a full circle metallic sleeve whcih can be adequately tightened around the exterior of a pair of abutting sections of conduit. Although these fittings produce adequate couplings, they are not entirely satisfactory in that they are bulky in size and are relatively expensive.

Therefore, a need exists for a method and apparatus of interconnecting abutting sections of conduits in the limited space of an excavation or a manhole and which is simple and inexpensive to install and durable in use.

Therefore, according to one aspect of the present invention, an improved method for abutting sections of conduit liner is provided which can be performed within the limits of an excavation or manhole. According to another aspect of the present invention, improved apparatus are provided for use in a confined space in forming an improved coupling between abutting conduit sections.

More particularly, according to the present invention, an improved method and apparatus is provided for connecting a pair of abutting conduit section liners, such as those used to reline a sewage system. According to the improved method, access is gained to buried conduits at spaced locations and the conduit is opened and cleaned. Lengths of polyethylene liner are axially inserted into the conduit through the openings. Thereafter, an improved sleeve of the present invention is positioned over the end of one of the sections and thereafter, the ends of the sections are concentrically aligned and abutted. The ends are attached together by applying tape around the circumference at the intersection of the sections. Thereafter, the sleeve is moved to a position overlapping the intersection of the sections and the annular space between the interior of the sleeve and exterior of said sections is closed by use of a gasket and tape at ends of the sleeve. A settable polyurethane foam is then injected through a port located intermediate of the ends of the sleeve to fill the annular space. Thereafter, the polyurethane foam is allowed to set.

The advantages and features of the improved method and apparatus of the present invention will be more readily appreciated by those of ordinary skill in the art as disclosure thereof is made in the following description by reference to the accompanying Drawings in which:

BRIEF DESCRIPTION OF THE DRAWINGS

FIG. 1 is a perspective view of an excavation illustrating a coupling installed on abutting ends of conduit liners;

FIG. 2 is a perspective view of abutting conduit liner sections illustrating the step of placing the sleeve around the exterior at one of the sections;

FIG. 3 is a view similar to FIG. 2, illustrating the step of attaching the ends of the conduit sections together by use of a tape material;

FIG. 4 is a section view illustrating the sleeve in position with the annular space sealed at the ends of the sleeve and the polyurethane material being inserted through the port; and FIG. 5 is an axial section of the completed improved coupling of the present invention.

DESCRIPTION OF THE PREFERRED EMBODIMENT

Referring now to the Drawings, wherein like reference characters designate like or corresponding parts throughout the several views, there is illustrated in FIG. 1, a buried sewer main conduit 10, which has been opened and relined with right and left hand conduit liner sections 12 and 14, respectively. The sections 12 and 14 have their extending ends coupled together by an improved coupling 16 which is installed according to the improved method of the present invention.

In the practice of the improved method of the present invention, access to the conduit 10 is provided by forming an excavation 18. In the alternative, access can be provided through existing manholes. Although only one excavation 18 is illustrated, it is to be understood, of course, that numerous excavations are made at points spaced along the length of the conduit 10.

Next, the conduit 10 is opened and cleaned of roots and other debris by conventional well-known methods in the art. Thereafter, due to the flexibility of the liner material, a right hand liner 12 of suitable material such as polyethylene, is axially inserted into the conduit 10 in the direction of arrow 20. Next, the left hand liner 14 is axially inserted in conduit 10 in the direction of arrow 22. These liner sections 12 and 14 are of sufficient length to span the distance between the adjacent excavations.

Next, the extending ends 24 and 26 of the conduit liners 12 and 14, respectively, are trimmed so that their ends 24 and 26 will abut when the liner sections 12 and 14 are coaxially aligned.

Thereafter, the improved sleeve 30 is positioned over the end of one of the conduit liner sections 12 and 14 by moving it in the direction of arrow 32, as shown in FIG. 2. Movement of the sleeve 30 is continued until the sleeve is spaced from the end 24 and is in the position 30' shown in phantom lines in FIG. 2. The sleeve 30 has a generally cylindrical shape with the internal diameter of the sleeve greater than the outer diameter of the conduit liner sections 12 and 14. In the preferred embodiment, the sleeve is polyethylene, but it is understood that other suitable materials such as polyvinylchloride, polybutylene, polypropylene, or the like, may be used. In addition, a port 34 is provided in the sleeve 30 and preferably is centrally positioned between the ends of the sleeve 30. The port extends through the wall of the sleeve 30.

After the sleeve 30 has been positioned around one of the conduit liners, the ends 24 and 26 are moved to an abutting coaxial position as illustrated in FIG. 3.

Thereafter, a length of tape 40 is wrapped around the abutting ends 24 and 26 to initially assist in holding the ends 24 and 26 in a coaxial abutting position and to prevent the entrance of material to the interior of the liner sections 12 and 14. In the preferred embodiment, tape 40 is a pressure sensitive adhesive tape 2 inches wide.

Next, the sleeve 30 is moved in a direction of arrow 42, shown in FIG. 3. The sleeve is moved until it overlaps the ends 24 and 26 and is generally centrally positioned over the ends of the liner sections 12 and 14.

This position is illustrated in FIG. 4 wherein the sleeve 30 is positioned with port 34 adjacent to the ends 24 and 26. With the sleeve 30 in position, the annular space 44 formed between the interior of the sleeve 30 and the exterior of the conduit liner sections 12 and 14 is closed off by use of tape 47 and a compressible gasket 50. Tape 47 is positioned to span the annular space at the ends of the sleeve 30, as shown in FIG. 4 while gasket 50 provides a centering function. Thereafter, dispenser 45 is positioned to dispense suitable foamable settable material 48 through the port 34 and into the annular space 44. The movement of the foam 48 is illustrated by arrows 46. These arrows 46 represent the movement of the foam as it is injected under pressure through port 34 and into the annular space 44. The foam material 48 is preferably a settable foam resinous sealant material which is mixed and injected into the annular space as illustrated. A resinuous sealant material is preferably a foamable setting synthetic polymer and more preferably, a foamable thermosetting plastic. The sealant material should be foamable and expand upon application to form a complete fit in the annular space. It should be non-soluble as well as resistant to attack from fluids in which it is used. Materials which are preferred in the practice of the present invention include polyurethane foams, acrylamide foams, and elastomer foams with the particular preferred material being polyurethane foams.

In FIG. 5, the annular space 44 is illustrated filled with a foam material 48. This configuration is formed by allowing the foam 48 to set after it is injected into the space 44.

Thus, the present invention teaches an improved method and apparatus which allows the connection of abutting conduit liners in a confined space in a simple, efficient and inexpensive manner. It is apparent that the improved method of the present invention could be used to repair other conduits of various shapes and sizes.

It is to be understood, of course, that the foregoing disclosure relates only to preferred embodiments of the present invention and that numerous alterations and modifications can be made by those of ordinary skill in the art without departing from the spirit and scope of the invention as set forth in the appended claims.

What is claimed is:

1. A method of relining a buried conduit comprising:
   excavating to provide access to the conduit;
   opening the conduit at the excavation to provide access to the interior of the conduit in two directions;
   inserting separate sections of conduit liner through the opening and into the conduit in opposite directions until the ends of the two sections are abutting to thereby reline the conduit;
   positioning a cylindrical sleeve with a port through its wall at a point intermediate the ends of said sleeve onto the end of one of said sections;

positioning the ends of said sections in a coaxial abutting arrangement;

overlapping the ends of the sections with adhesive tape to connect the ends of the sections together;

moving the sleeve to a position overlapping the ends of the sections;

connecting the ends of the sleeve to the exterior of the conduit sections by wrapping adhesive tape around the sleeve ends to seal the annular space between the interior of the sleeve and the exterior of the conduit sections;

injecting settable polyurethane foam through the port in the sleeve to fill the annular space between the interior of the sleeve and the exterior of the conduit sections; and allowing the polyurethane foam to set.

2. A method of connecting conduit liner sections within a conduit system, comprising:

positioning the ends of the two sections of conduit liner in a coaxial abutting relationship;

positioning a cylindrical sleeve with a port through its wall at a point intermediate the ends of said sleeve onto the end of one of said sections;

positioning the ends of said sections in an aligned abutting arrangement;

overlapping the ends of the sections with adhesive tape to connect the ends of the sections together;

moving the sleeve to a position overlapping the abutting ends of the sections;

connecting the ends of the sleeve to the exterior of the conduit sections by wrapping adhesive tape around the sleeve ends to seal the annular space between the interior of the sleeve and the exterior of the conduit sections;

injecting settable polyurethane foam through the port in the sleeve to fill the annular space between the interior of the sleeve and the exterior of the conduit sections; and allowing the polyurethane foam to set.

3. A method of relining a conduit comprising:

opening the conduit at a point spaced away from the ends to provide access to the interior of the conduit;

inserting separate sections of conduit liner through the opening and into the conduit in opposite directions until the ends of the two sections are abutting to reline the conduit;

placing a cylindrical sleeve over the exterior of the end of one of the conduit sections;

positioning the ends in a coaxial abutting relationship;

positioning the sleeve overlapping the abutting ends;

thereafter filling the annular space between the sleeves and exterior of the annular sleeves with a settable material; and allowing the settable material to set.

4. The method of claim 3 additionally comprising the steps of sealing the exposed portions of the settable material.

5. The method of claim 3 further comprising the steps of attaching the ends of the sections together prior to filling the annular space with settable material.

6. The method of claim 3 wherein said filling step comprises injecting said settable material through a port in said sleeve located away from the ends of said sleeve.

7. The method of claim 6 wherein said injection comprises injecting polyurethane foam into said annular space.

8. The method of claim 6 additionally comprising joining the abutting ends of said sections.

9. The method of claim 8 wherein said joining comprises taping the abutting ends of said sections together with pressure sensitive tape.

10. The method of claim 3 additionally comprising the step of closing the ends of the annular space formed between the interior of the sleeve and the exterior of the conduit sections prior to filling the space with settable material.

11. The method of claim 10 wherein said closing comprises applying tape across the open ends of said annular space.

* * * * *

UNITED STATES PATENT AND TRADEMARK OFFICE
CERTIFICATE OF CORRECTION

PATENT NO. : 4,049,480
DATED : Sept. 20, 1977
INVENTOR(S) : C. T. Kutschke

It is certified that error appears in the above-identified patent and that said Letters Patent are hereby corrected as shown below:

Column 2, line 24, "whcih" should be --which--.

Column 4, line 55, "9n" should be deleted.

Signed and Sealed this

Seventh Day of March 1978

[SEAL]

Attest:

RUTH C. MASON
Attesting Officer

LUTRELLE F. PARKER
Acting Commissioner of Patents and Trademarks